United States Patent [19]

Goodwin

[11] 3,970,614

[45] *July 20, 1976

[54] NUTRIENT PROTEIN FROM KERATINACEOUS MATERIAL SOLUBILIZED WITH N,N,-DIMETHYLFORMAMIDE

[75] Inventor: William D. Goodwin, Atlanta, Ga.

[73] Assignee: The Athlon Corporation, Atlanta, Ga.

[ * ] Notice: The portion of the term of this patent subsequent to Nov. 20, 1990, has been disclaimed.

[22] Filed: Dec. 13, 1974

[21] Appl. No.: 532,731

Related U.S. Application Data

[63] Continuation-in-part of Ser. No. 397,625, Sept. 17, 1973, abandoned, which is a continuation-in-part of Ser. No. 167,856, July 30, 1971, Pat. No. 3,773,745.

[52] U.S. Cl. .............................. 260/123.7; 426/556; 426/558; 426/657; 426/653; 426/608; 426/610; 426/612; 426/613
[51] Int. Cl.$^2$ ............................................ A23J 1/10
[58] Field of Search ................................. 260/123.7

[56] References Cited
UNITED STATES PATENTS

| | | | |
|---|---|---|---|
| 2,445,028 | 7/1948 | Jones et al. | 260/123.7 X |
| 2,445,029 | 7/1948 | Jones et al. | 260/123.7 X |
| 2,447,860 | 8/1948 | Jones et al. | 260/123.7 |
| 3,773,745 | 11/1973 | Goodwin | 260/123.7 |

OTHER PUBLICATIONS

Chem. Abstracts, vol. 78, 1973, 28211d, Blomback, effective date 8/1972.

Chem. Abstracts, vol. 54, 1960, 13224d–h, Schoberl.

Chem. Abstracts, vol. 78, 1973, 5110f, Kubitsky, effective date 8/1972– and subject index p. of vol. 78.

Primary Examiner—Howard E. Schain
Attorney, Agent, or Firm—Edmund M. Jaskiewicz

[57] ABSTRACT

Keratinaceous materials, such as poultry feathers, fur, hair, and hoofs, are solubilized by treatment with N,N-dimethylformamide or an aqueous solution thereof to yield a nutrient protein composition which is suitable for use as a food or food supplement for animals and humans and as a food material in food products.

6 Claims, No Drawings

NUTRIENT PROTEIN FROM KERATINACEOUS MATERIAL SOLUBILIZED WITH N,N,-DIMETHYLFORMAMIDE

RELATED APPLICATION

The present application is a continuation-in-part of the copending application Ser. No. 397,625 filed Sept. 17, 1973, now abandoned which is a continuation-in-part of the application Ser. No. 167,856 filed July 30, 1971, now U.S. Pat. No. 3,773,745.

BACKGROUND OF THE INVENTION

The present invention relates to the solubilization of the keratinaceous constituents of various hard and soft keratin source materials to derive therefrom a novel nutrient material suitable in itself as a food or for incorporation into food products.

It is known to hydrolyze keratinaceous materials such as feathers and the like by the use of alkalis such as strontium hydroxide, to produce a hydrolysate having a low content of the amino acids cystine, tyrosine and tryptophane, which is suitable for cosmetic use, and a process of this type is disclosed, for example, in the U.S. Pat. No. 1,974,554. It is also known to extract water soluble materials from a keratin structure such as animal hair, horns, hoofs, and the like, using various water-miscible polar solvents including alcohols and ketones, to obtain extracts adapted for topical use in human skin treatment.

The poultry processing industry operates on a scale which results in the production of large tonnages of by-product keratin-aceous materials, principally feathers. Largely, the present disposal of these by-products is devoted to the production of feather meal. The industry is re-oriented by the present invention to the production of food for human consumption thereby upgrading the materials to a more valuable purpose and to using more effectively the economic potential of these by-products.

Another source of keratinaceous material in the poultry industry includes eggs which cannot be sold on the market, eggs which are underdeveloped or unborn chicks. Any naturally occurring protein can be treated according to the present invention and reconstituted as a protein isolate.

Animals slaughtered for human consumption provide another source of keratinaceous materials. Slaughter houses and meat packing plants processing cattle, hogs, sheep, horses and goats produce keratinaceous material in the form of hair fur, skin, hoofs and horns which can be effectively processed according to the present invention so as to utilize more effectively numerous and varied keratin sources to produce protein nutrient.

In the garment industry there are many waste materials, such as scraps of fur, silk, cashmere, angora wool and other material from keratinaceous protein which would also be a source of beginning products for the present invention.

It is also possible to dispose of entire animals and birds by the present invention such as processing of the carcasses entire chickens and other animals in order to obtain protein nutrients.

GENERAL DESCRIPTION OF THE INVENTION

In accordance with the present invention, there is provided a novel method for the solubilization and utilization of hard and soft keratinaceous materials, including but not limited to, feathers of various domestic fowl, such as chickens, ducks, turkeys, and the like, hog hair, hair and fur of animals, silk, horns, hoofs, beaks, wool, claws and nails, skins, hides, scraps of leather and fur and the like. The invention will be illustrated with regard to the treatment of chicken feathers and other keratin sources, but it is to be understood that its scope is not to be considered as limited thereby.

In accordance with the invention, keratinaceous materials, such as chicken feathers, are subjected to the action of N,N-dimethyl formamide (DMF) or an aqueous, or other solution thereof, for a period of time sufficient to solubilize the feathers as a protein soluble in the extractant.

Basically, all membranes and tissues of animals can be processed according to the present invention and deduced new protein constituents. The process also covers hard and soft keratins which are of the same composition but the soft keratins are of a lower density.

Since there may be difficulty in handling some of the hard keratins or hard portions of the keratin sources such as the quills of feathers, these source materials can be ground into small particles to facilitate accessibility which then reduces the time of reaction. There is little difference in reaction time between hard and soft keratins because the hard keratins are milled to small particles such as flour size. The hard keratins will simulate table salt after such size reduction operations.

In the processing of the entire chicken, the chicken is first milled into small particles, then solubilized and the different proteins then drawn off because of different molecular weights. When the entire animal or bird is thus processed the protein nutrient obtained is particularly suitable for pet food and as food or feed for other animals. When processing an entire larger animal actually the viscera is solubilized. The blood is either separated or processed separately or together with the viscera.

N,N-dimethylformamide is a liquid, b.pt. 153°C.,sp.gr. 0.945, which is miscible with water, and has been used heretofore principally as a solvent for polymeric materials. So far as known, it has not been used, prior to the present invention, as a medium for the solubilization of proteinaceous materials. In fact, both casein and gelatin are reported to be insoluble in DMF. Accordingly, it was surprising and unexpected to discover that dimethylformamide and its aqueous solutions act as a solvent of the protein of feathers, and other keratinaceous materials which is of primary nutrient value.

The dimethylformamide may be employed in 100% concentration, or in admixture with water in an amount not less than about 75% DMF by weight. The proportion of extractant to keratinaceous material will ordinarily range between about 15 and about 30 parts of DMF (100% basis) per part of keratinaceous material, by weight.

While whole feathers and their associated parts, including quill portions, may be treated in their removed condition, advantageously the feathers, including quill portions are crushed or ground prior to contacting them with the DMF or DMF solution to facilitate their accessibility.

The solubilization may be performed at atmospheric or superatmospheric pressure, but preferably it is carried out at atmospheric pressure, this being one of the advantages of the process of the invention. The temperature of the extraction will generally correspond to the chosen pressure, but for the purposes of the invention, the extraction is preferably carried out by contacting the feathers with boiling DMF or DMF solution at atmospheric pressure. Advantageously this is done by introducing the feathers, which may have been subjected to a size reduction process, into a body of DMF solution boiling and under reflux.

The time of reflux, the concentration of DMF with water can be varied considerably as shown by the examples with significant changes in yield. DMF alone can be used as the solvent to obtain comparable yields but will result in a slightly darker colored product. Also, there is the possibility of destruction of some amino acids.

The treatment time will depend upon the nature of the feather, the concentration of the DMF, and the extent to which the solvation is to be carried, as well as the usual parameters of temperature and pressure, but will generally be of the order of about 15 minutes to about 8 hours, although the time can be extended to 20 hours or more. However, such extended treatment periods do significantly increase the yield of extracted proteinaceous component, and thus the time interval chosen depends upon economic considerations. The use of aqueous DMF solutions may be preferable to that of pure DMF, since the latter may sometimes furnish a product slightly darker in color and cause the lability of some amino acids.

When the solubilization step is complete, the hot solution is separated from the insoluble keratinaceous material by any suitable method, as by filtration or centrifuging. The clarified solution is cooled to ambient temperature, and forms a gel.

The insoluble residue may be further extracted with DMF or DMF solution to obtain additional protein, or dried and milled to produce an animal feed.

The process of solubilization of the keratinaceous proteins, in accordance with the invention, is to be distinguished from hydrolysis, such as those known heretofore. The process of the invention results in the production of a digestible whole protein from keratinaceous materials. While not wishing to be bound by any particular theory, it is believed that in the treatment with dimethylformamide the keratinaceous constituents of the keratin sources, which possess a quaternary structure, are broken up to relieve the stresses in the long chain molecules. In the keratinaceous state, the protein is in a nondigestible form owing to the inaccessibility of the peptide linkages to digestive enzymes. The quaternary structure of a protein is due largely to secondary valence bond forces. Compared with a primary valence bond these secondary forces are individually extremely weak but they are nevertheless significant because of the large number present. Breaking these secondary valences forces results in loss of quaternary structure and hence increases the accessibility of the resulting protein to enzymatic action. In this way, the process of the invention yields a protein concentrate which is virtually 100% digestible. The direct production or even destruction of amino acids which is characteristic of acid or alkaline hydrolytic treatments is thus avoided or minimized by the use of dimethylformamide, whereby a protein product representing a break-up of long chain molecules is obtained.

The protein gel obtained by the cooling of the clarified DMF extract is reduced of its protein content by the addition of water, methylene chloride, acetone or other solvents in which the protein is insoluble therefore precipitating the protein, recovering the DMF by a normal distillation process and recycling the DMF.

The final product may be dried and milled to a near-white, tasteless and stable powder. Independent tests have confirmed that the product is a 100% protein with extremely low trace elements and has a digestibility at 97.3%.

The nutritional possibilities of this protein product are apparent from Table I which compares the nutritional value of 70 grams of the protein product to the amino acid requirement of a 70 Kg man. 70 gm protein intake has been selected on the basis of the usual approximation of 1 gm per Kg body weight of a protein of good biological value.

TABLE I

| AMINO ACID | AMINO ACID REQUIREMENTS OF YOUNG ADULTS (70 Kg) | |
|---|---|---|
| | gm per DAY[1] | gm per 70 gm of Protein Product[2] |
| Arginine | 0 | 4.60 |
| Histidine | 0 | .01 |
| Tryptophan | .49 | |
| Phenylalanine[3] | 2.17 | 1.52 |
| Lysine | 1.61 | .40 |
| Threonine | .98 | 2.88 |
| Valine | 1.61 | 5.19 |
| Methionine[3] | 2.17 | .02 |
| Leucine | 2.17 | 5.24 |
| Isoleucine | 1.40 | 3.45 |

[1]Taken from W. C. Rose Federation Proc. 8, 546 (1949)
[2]70 gm protein was selected from the general rule of 1 gm protein per Kg body weight for growth and maintenance.
[3]Requirements are significantly reduced by the provision of tyrosine and cystine.

The gel is spray dried by being passed under pressure through a tungsten discharge nozzle into a stainless steel chamber maintained at atmospheric pressure, into which dry air is introduced at a temperature of about 400°F, the air being withdrawn from the chamber at about 240°, but these temperatures are illustrative, and may be varied within wide limits. This drying step also volatilizes the DMF which is condensed and recovered. The proteinaceous product is a dry powder without any vestige of DMF, light tan in color, having a particle size averaging about 2 mils or slightly more, the particles being crystalline in appearance. The product has a pH of about 7, and is 100% digestible and non-toxic.

Another method of drying employs the use of drum dryers of flakers. The gel is fed between two heated drums rotating in opposite directions such that the wetted surfaces display their evaporating film coating on the periphery of the drums untouched until reaching the stripping blades where the dried film is removed in the form of flakes. This product is likewise void of any residual DMF.

The protein product may be dried or lyophilized by a normal freeze drying process known in the art such as by dissolving the water in the atmosphere of a freeze chamber. Moisture is condensed and recrystallized because of the low temperature and more moisture goes into the atmosphere. The dried product is unaffected by the freeze drying process and retains the same properties and characteristics as described above.

The protein can be extracted and altered from keratinaceous tissue by a number of applications of DMF or DMF solutions by progressively longer periods of refluxing and/pr progressively higher temperatures. Each successive extraction yields protein of lower jelly strength and viscosity. Since a higher proportion of protein is extracted in the early treatment of keratin the proportion of high protein value is much greater than later treatments.

Upon completion of the solubilization step the hot solution can be subjected to a dialyzer, and acidification, if desired, to reclaim substantially all of the DMF and to remove any other impurities from the protein product. The dialysis thus removes all reagents. Any other soluble material is retained because its molecular weight and size will not permit transfer. The recovered DMF can largely be recycled with make-up DMF added as necessary. Thus, the cost of the process is significantly reduced since the cost of DMF represents a significant portion of the total cost of the process.

Typical illustrative analysis of the dried protein, as obtained from chicken feathers is as follows:

TABLE II

AMINO ACID ANALYSIS OF PROTEIN COMPOSITION

| Amino Acid | μM/mg Protein*[1] | % Amino Acid in Protein |
|---|---|---|
| Aspartic Acid | .358 | 4.76 |
| Threonine | .345 | 4.11 |
| Serine | 1.292 | 13.57 |
| Proline | .875 | 1.01 |
| Glutamic Acid | .624 | 9.18 |
| Glycine | 1.008 | 7.57 |
| Alanine | .411 | 3.66 |
| Valine | .618 | 7.24 |
| Cystine | .088 | 2.11 |
| Methionine | .017 | .025 |
| Isoleucine | .376 | 4.93 |
| Leucine | .570 | 7.48 |
| Tyrosine | .102 | 1.85 |
| Phenylalanine | .267 | 4.11 |
| Lysine | .039 | .57 |
| Histidine | .001 | .016 |
| Arginine | .377 | 6.57 |

*Based on sample as 100% protein.
[1]Micro mole per milligram of protein

The protein composition of the invention is useful as a supplement to food materials to improve their nutritional value, such food materials including, for example, flour, baked goods, biscuit and cake mixes, pancake mixes, soups, gravies, cereals, noodles or pasta products and confectionery. The protein product of the invention can also be used directly by forming the dried powder into tablets, wafers, and the like, for consumption by humans and animals, or a feed additive for veterinary use. The concentrate may be added to candy to balance the protein value of the candy. The concentrate contains all of the essential amino acids except tryptophane, and is desired, a small amount, e.g., 1.75% of tryptophane may be admixed with the concentrate.

While the protein product can be produced in dry form, as disclosed above, it can also be produced in the form of a wet paste having a consistency similar to that of cottage or cream cheese. Such a paste can then be wet pressed into pellets, cakes or other forms for use as a food or a food supplement.

15%(byweight) of the protein concentrate in paste form can be mixed with 85% distilled water in a hi-speed blender or homogenizer to emulsify the protein and water. This dispersion will remain over a long period of time and can be used as a milk or food.

The protein product in dry powder form can be applied as a suspension in a wide variety of drinks including soft drinks and juices to increase the protein content of the drink. The suspension of the protein powder is stable and will not precipitate out quickly. It is best used in orange, grape, chocolate and similar drinks.

While the protein product disclosed herein is particularly suitable for use as a food for humans and animals, incorporation into a food or a food supplement for humans and animals, it can also be used as a constituent of various cosmetics, skin conditioners, including but not limited to shampoos, hair conditioners, bleach accelerators, and other preparations particularly adaptable for the skin and hair. The protein product can also be used in pharmaceuticals.

DESCRIPTION OF THE PREFERRED EMBODIMENTS

The following examples illustrate the practice of the present invention, but are not to be regarded as limiting:

EXAMPLE 1

A nutrient protein composition is produced as follows: 100g. of chicken feathers, 2100 g. dimethylformamide (DMF) and 860 g. water are refluxed at boiling temperature (approximately) 100°C) at atmospheric pressure for 3 hours in a round bottom three-necked flask equipped with a mantle and reflux condenser and gas trap. Insoluble feather material is separated from the hot reaction mixture by filtration, and the clarified solution allowed to cool to room temperature to form a gel.

Approximately 1 part gel by volume is diluted with 25 parts water to precipitate the protein composition which is removed by filtration. The filtrate is passed through distillation equipment to remove the water content and to reclaim the DMF.

The composition consisting of DMF soluble components provides a digestible and non-toxic protein product. Refluxing the same mixture for 3 hours yields 79.5 g. protein, while refluxing for 20 hours yields 80.2 g. The protein gel composition when dried forms a powder or flakey product useful as a food material or nutrient protein void of any residual DMF.

EXAMPLE 2

Proceeding as in Example 1, 100 g chicken feathers are admixed with 630 g DMF and 315 g water, and the mixture is refluxed for 3 hours, the yield being 70.5 g. Refluxing for 15 hours yields 72.3 g.

EXAMPLE 3

Proceeding as in Example 1, 100 g chicken feather portions are refluxed respectively with 945 g DMF and 374 g water, and 1215 g DMF and 475 g water. The respective yields are 79 g and 87.5 g of dried protein.

EXAMPLE 4

Proceeding as in Example 1 but using greater quantities with the materials in pounds, 5 lbs. of chicken feathers are admixed with 800 lbs. DMF and 60lbs. water, and the mixture is refluxed for 3 hours to yield 4.3 lbs. protein.

EXAMPLE 5

A protein composition is produced as follows: 100 g of chicken feathers, 2100 g dimethylformamide (DMF) and 860 g water are refluxed at boiling temperature (approximately 100 °C) at atmospheric pressure for 3 hours in a three-necked flask equipped with a reflux condenser and gas trap. Insoluble feather material is separated from the hot reaction mixture by filtration, and the clarified solution allowed to cool to room temperature to form a gel.

Approximately 1 part gel by volume is diluted with 25 parts water to precipitate the protein composition which is removed by filtration. The filtrate is passed through distillation equipment to remove the water content and to reclaim the DMF.

The composition consisting of DMF soluble components provides a digestible and non-toxic protein product. Refluxing the same mixture for 3 hours yields 79.5 g protein, while refluxing for 20 hours yields 80.2 g. The protein gel composition when dried forms a powder or flakey product void of any residual DMF.

EXAMPLE 6

To remove the DMF by dialysis, the feathers are solubilized as in Example 1. Upon completion of this solubilization step the hot solution has a pH of 6.5 – 6.8. To recover the DMF, the hot solution is put into a dialyzer having a nylon dialytic membrane (du Pont) having a pore size of 50 A. The membrane is semipermeable and has a pore size through which all of the DMF - water solution up to a molecular weight of 70 will pass through the membrane to reclaim all of the DMF and retain the protein product. The nylon membrane is not affected by the DMF. The protein product is then washed in water and the pH will then be about 6.8. The resulting protein product can be used as a food or food material since it is perfectly pure, tasteless, odorless and compatible with whatever foods or substances with which it is mixed in solid insoluble form. The protein product is in the form of a wet paste having a consistency similar to that of cream or cottage cheese.

EXAMPLE 7

Proceeding as Example 6, sufficient acetic acid or a similar carbo-oxylic acid is added to the hot solution to drop the pH about 0.2 to bring about immediate precipitation and to speed the process. The liquid is then passed through a dialyzer, as in Example 6, and when washed with water the pH will increase to about 6.8.

EXAMPLE 8

To remove the DMF by centrifuging, the feathers are solubilized as in Example 1. The hot solution is then centrifuged to remove undissolved residue. The clear solution is then added to pure water at room temperature in proportions of 1 part DMF solution to 2.5 parts water. The protein precipitates in an soluble flocculent form. The mixture containing the precipitate is then passed through a centrifuge to separate the clear DMF-water solution from the low-moisture containing precipitate. The precipitate is then reintroduced to pure water at room temperature and the centrifuge process is repeated to remove traces of DMF as well as any insoluble salts. The proportions are 1 part precipitate solids to 20–30 parts of water. In order to reclaim the DMF, the centrifugate of the first separation is passed into an evaporator removing the excess water. The DMF may contain a very small percent of unremoved protein, (0.0–2.0%), however, it is suitable for use as a recycled reagent.

The protein composition at this stage is in the form of a wet paste and can be used in this form.

If desired, the wet paste can be dried by being placed in diced or broken form on trays which are then placed in a dry oven with circulating air at approximately 150°F maximum. The resulting dried protein composition can be milled to any desired particulate size and to a very fine powder since it is friable to infinitely small particles.

EXAMPLE 9

Biscuits
1¾ cups Bisquick
5 Tablespoons of the protein product of Example 1
½ cups water
Do not excessively handle dough. In an oven at 450°, bake for 10–12 minutes.

EXAMPLE 10

Pancakes
1¾ cups plus 1 tablespoon Bisquick
3 Tablespoons of the protein product of Example 1
1 egg
1⅓ cups milk
Beat to a smooth batter.

EXAMPLE 11

Coffee Cake
1¾ cups plus 2 Tablespoons Bisquick
1½ Tablespoons of the product of Example 1
2 Tablespoons sugar
1 egg
⅔ cups water
Mix all ingredients. Bake in greased pan for 20–≅minutes. Oven at 400°.

EXAMPLE 12

Waffles
1 ¾ cups plus 1 Tablespoon Bisquick
3 Tablespoons of the protein product of Example 1
2 Tablespoons shortening, melted or salad oil
1 ⅓ cups milk
1 egg
Beat to a smooth batter.

The biscuit baking mix used in the previous examples can be considered representative of a typical preparation consisting of wheat flour, shortening, leavening, buttermilk powder, salt and dextrose.

In the subsequent examples, each process was carried out in a round bottom three-necked flask equipped with a mantel and reflux condenser and gas trap. The specific keratinaceous material was added to the stated mixture of DMF and water was brought to reflux temperature of 98.5°C. After the stated time of reflux each solution was filtered hot to remove insoluble matter and then allowed to cool to room temperature to form a gel. However, the cooled gel or hot solution when added to water would precipitate the protein content in the form of a white solid. The solid was washed with de-ionized water of 25 parts water to one part gel by volume to purify the solid free from DMF and trace elements. The freedom from DMF is beyond the detectible range as tested by chromotographic methods.

| Keratinaceous Material | DMF (g.) | H₂O (ml.) | Time (hrs.) | Yield (%) |
| --- | --- | --- | --- | --- |

-continued

| | | | | | | |
|---|---|---|---|---|---|---|
| Example 13 | 100 | g. Fur | 944 | 375 | 20 | 79 |
| 14 | 3.75 | g. Fur | 95 | 30 | 3 | 80.5 |
| 15 | 159 | g. Fur | 1000 | 500 | 3 | 70.5 |
| 16 | 159 | g. Fur | 1000 | 500 | 15 | 72.3 |
| 17 | 20 | g. Wool | 243 | 95 | 15 | 87.5 |
| 18 | 3.5 | g. Wool | 76 | 30 | 20 | 80.2 |
| 19 | 3.25 | g. Wool | 76 | 30 | 8 | 79 |
| 20 | 100 | g. Hair(Hog) | 1215 | 475 | 8 | 87.5 |
| 21 | 100 | g. Hair (Hog) | 630 | 315 | 3 | 70.5 |
| 22 | 100 | g. Hair (Hog) | 630 | 315 | 15 | 72.3 |

(Horns and hoofs-crushed to approx. 1/16 inch granules)

| | Quantity (g.) | DMF (g.) | H₂O (ml.) | Time (hrs.) | Yield (%) |
|---|---|---|---|---|---|
| 23 | 75 | 855 | 240 | 20 | 59.5 |
| 24 | 150 | 1000 | 350 | 12 | 51.5 |
| 25 | 150 | 1000 | 350 | 20 | 52.5 |
| 26 | 100 | 1225 | 385 | 10 | 61.2 |
| 27 | 100 | 815 | 350 | 8 | 49.0 |

Chicken nails, talons, and beaks-crushed to approx. 1/16 inch granules

| | Quantity (g.) | DMF (g.) | H₂O (ml.) | Time (hrs.) | Yield (%) |
|---|---|---|---|---|---|
| Example 28 | 20 | 385 | 90 | 20 | 58.0 |
| 29 | 8.5 | 225 | 55 | 20 | 61.0 |
| 30 | 5 | 100 | 35 | 10 | 58.5 |
| 31 | 5 | 100 | 60 | 20 | 63.0 |
| 32 | 6.5 | 200 | 65 | 20 | 60.5 |

Tanned hides (shredded to 1/8 inch strips)

| | Quantity (g.) | DMF (q.) | H₂O (ml.) | Time (hrs.) | Yield (%) |
|---|---|---|---|---|---|
| 33 | 40 | 750 | 200 | 20 | 31 |
| 34 | 20 | 550 | 175 | 20 | 32.5 |
| 35 | 10 | 400 | 100 | 12 | 33 |
| 36 | 10 | 250 | 75 | 10 | 30.5 |

Silk threads-(color not removed)

| | Quantity (g.) | DMF(g.) | H₂O (ml.) | Time (hrs) | Yield(%) |
|---|---|---|---|---|---|
| 37 | 30 | 500 | 175 | 8 | 61 |
| 38 | 15 | 300 | 80 | 8 | 60 |
| 39 | 15 | 200 | 80 | 3 | 60.5 |
| 40 | 10 | 200 | 80 | 1 | 57 |

It is understood that this invention is susceptible to modification in order to adapt it to different usages and conditions and, accordingly, it is desired to comprehend such modifications within the invention as may fall within the scope of the appended claims.

What is claimed is:

1. A protein composition comprising avian keratinaceous material solubilized by refluxing or boiling with N,N-dimethylformamide at boiling temperature and from which a composition consisting essentially of protein is recovered.

2. A protein composition as claimed in claim 1 and in the form of a dry powder.

3. A protein composition as claimed in claim 1 and in the form of a wet paste.

4. A protein composition as claimed in claim 1 wherein the composition is derived from chicken feathers.

5. A protein composition as claimed in claim 1 wherein the composition is a keratin protein.

6. A food material including as a nutritional ingredient a protein composition comprising avian keratinaceous material solubilized by refluxing or boiling with N,N-dimethylformamide and forming a composition consisting essentially of protein.

* * * * *